Oct. 27, 1959   O. L. HIBBARD ET AL   2,909,891
SUSTAINED POWER ELECTRIC CLOCK
Filed Dec. 31, 1956   4 Sheets-Sheet 1

INVENTORS
OSCAR L. HIBBARD
JOHN H. BAKELAAR
BY
AGENT

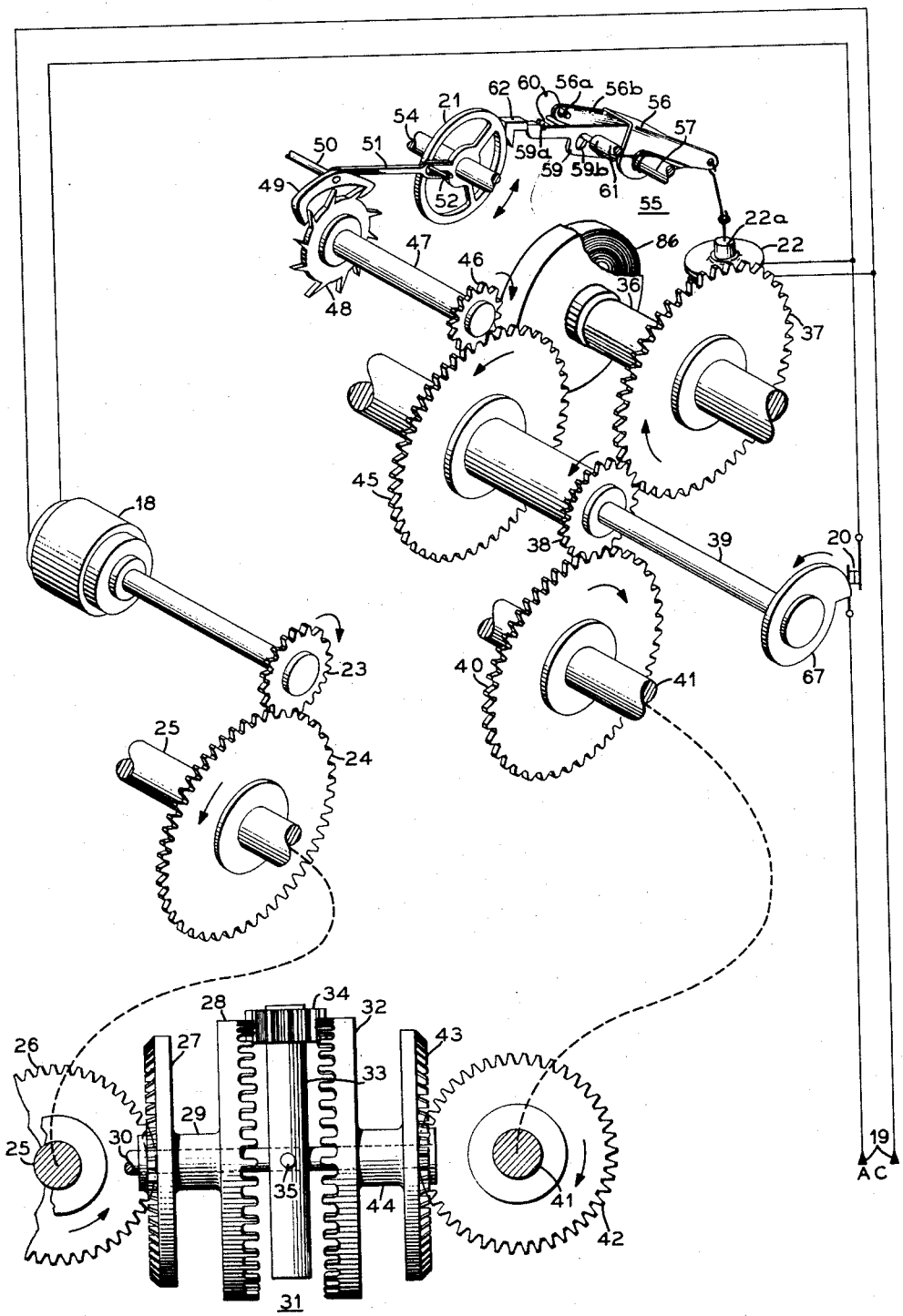
FIG_2_

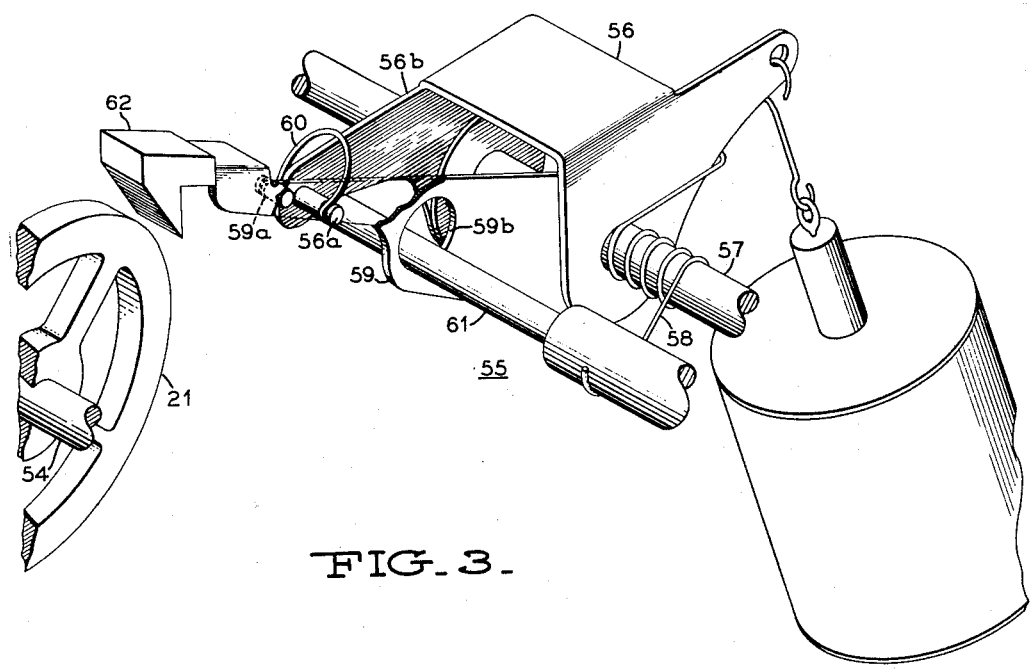
FIG_3_
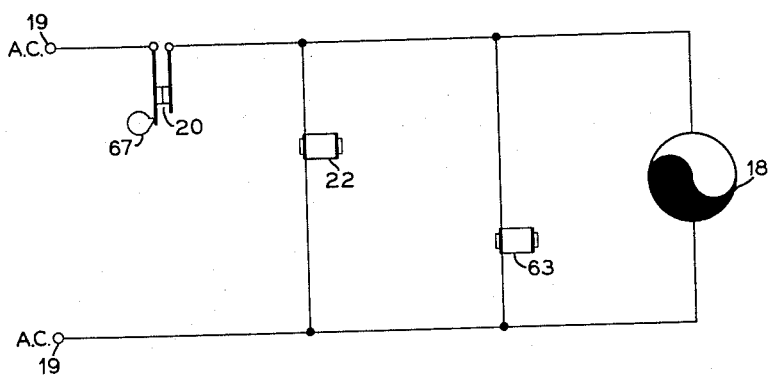
FIG_4_

Oct. 27, 1959     O. L. HIBBARD ET AL     2,909,891
SUSTAINED POWER ELECTRIC CLOCK
Filed Dec. 31, 1956     4 Sheets-Sheet 4
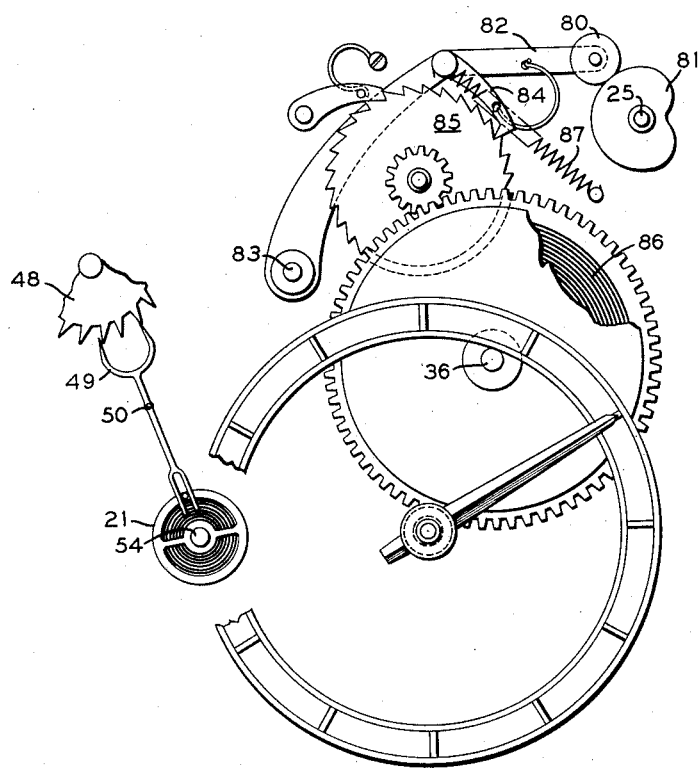
FIG_5_

United States Patent Office 2,909,891
Patented Oct. 27, 1959

2,909,891

SUSTAINED POWER ELECTRIC CLOCK

Oscar L. Hibbard, Johnson City, and John H. Bakelaar, Binghamton, N.Y., assignors to International Business Machines Corporation, New York, N.Y., a corporation of New York Application December 31, 1956, Serial No. 631,627

6 Claims. (Cl. 58—26)

This invention relates to a master program clock in general and in particular to improvements in the construction and operation of the drive mechanism for a master program clock wherein its time indicating element, or elements, is normally driven by a synchronous electric motor operated by current flow from the commercial light and power line, and wherein is provided a stand-by motor which, in the event of a power cessation, operates to drive the time indicating element at the correct time rate.

Specifically, the invention relates to a master clock which operates to send electrical impulses at regular intervals of time to all of the secondary clocks associated therewith in the system and each secondary clock is advanced a predetermined amount upon receiving each impulse. In addition to this, the master clock during certain predetermined intervals of time automatically regulates and effects synchronization with the master clock of any of the secondary clocks which may be fast or slow. An example of a master clock and an explanation of how such a clock functions in a clock system are fully disclosed in the U.S. patent to C. E. Larrabee, No. 1,878,931, dated September 20, 1932.

Heretofore, master clocks of the type briefly outlined above have been driven either by a synchronous electric motor operated by current flow from the commercial light and power line or they received their power from a spring-wound motor. Additionally, where the clock is normally driven by a synchronous electric motor operated from the power line, a stand-by or auxiliary motor is provided to operate and drive the time indicating element at the correct time rate in case the synchronous motor fails to operate effectively. An example of this latter type of master clock is shown in U.S. Patent No. 2,424,119, to F. Q. Rast, dated July 15, 1947.

It has often been the practice, heretofore, to equip master clocks with program devices to electrically and automatically control signals at preselected times. An example of such a program device may be had by reference to the U.S. Patent No. 702,808, issued June 17, 1902, to J. O. Lyman. Such a program device has usually been impulse advanced by a cam mechanism associated with the clock train or by direct gearing with the clock train of the master clock. Additionally, contacts employed in connection with the program device and normally in contact with the programming means places a relatively heavy drain or torque requirement on the clock escapement mechanism when being driven by the auxiliary drive means.

The present invention is designed as an improvement over the master clocks shown and described in the above-mentioned patents and, toward this end, it is among the principal objects of the invention to provide a sustained power clock, usable in systems of the type outlined above, and having associated therewith a moving element which is continuously driven, normally by a synchronous motor which derives its power from a commercial light and power source, and in the event of a power line failure by a spring-wound motor, thereby bridging over the hiatus during which there is a power interruption.

An object of this invention is to provide a clock of the above type which is of improved construction and arrangement of parts.

Another object is to provide a clock of the type mentioned above, which operates with a high degree of accuracy at all times, and one wherein the changeover from synchronous motor drive to stand-by motor drive, and vice versa, is accomplished in a highly effective and efficient manner.

A further object is to provide a clock of the type indicated, wherein a spring-driven motor is used as the stand-by and wherein an improved and simple means is provided for positively propelling the spring-driven motor into operation.

A further object is to provide a clock of the type indicated, wherein there is provided a means for preventing the spring-driven motor from being responsive to normal power line voltage variations.

Another object is to provide a clock of the type indicated which after change-over from synchronous motor drive to stand-by motor drive will remain operative in this manner in one or more even incremental periods of predetermined length, and dependent upon the duration of the power line failure, before being returned to the normal synchronuous motor drive operation.

Other objects of the invention will be pointed out in the following description and claims and illustrated in the accompanying drawings, which disclose by way of examples, the principle of the invention and the best mode, which has been contemplated, of applying that principle.

In the drawings:

Fig. 2 is a schematic view of the clock drive mechanism with the elements shown in perspective.

Fig. 3 is a diagrammatic view of a balance wheel caging mechanism for the spring-drive motor shown in an uncaged position.

Fig. 4 is a schematic circuit diagram for controlling the clock drive motors.

Fig. 5 is a fragmentary view of a spring-driven motor for a clock mechanism.

Figure 1:
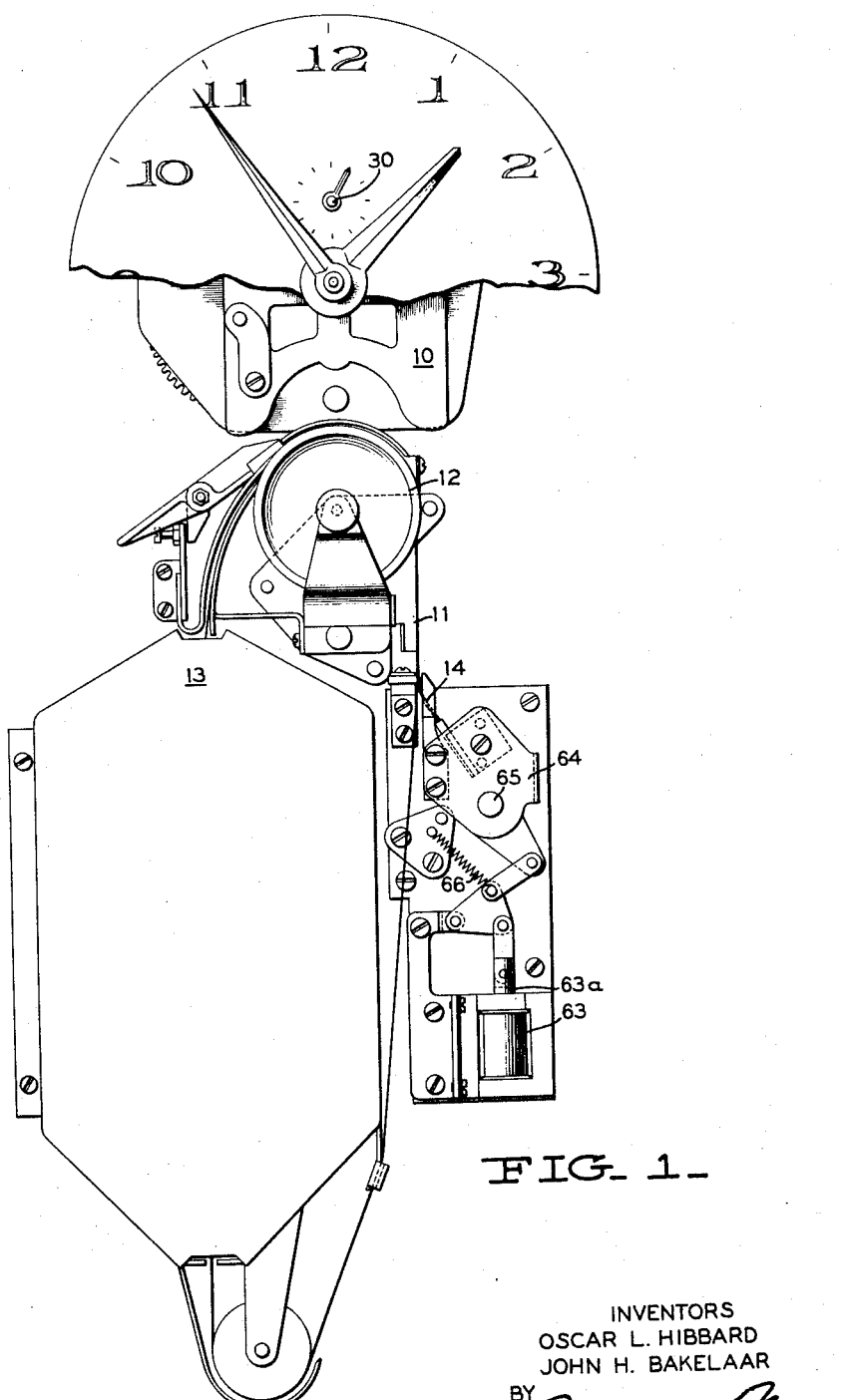
Fig. 1 is a fragmentary view of a master clock and program control device.

Referring to Fig. 1, there is shown a master program control clock comprising a master clock drive movement 10, a program tape 11, a tape drive drum 12 which is mechanically geared to the master clock, a random fold tape storage box 13, and a set of electromagnetically controlled tape sensing brushes 14.

Referring to Fig. 2 of the drawings, there is shown schematically a sustained power clock that is normally driven by a synchronous motor 18 which derives its power from a commercial power source and wherein is provided a spring-driven stand-by mechanism to drive the clock in the event of a power failure. Under normal condition, namely, when alternating current is present, the clock is driven by the synchronous motor 18 which receives its power from the A.C. terminals 19 via the closed contact points 20. The balance wheel 21 of the spring-drive motor will be caged or inoperative because solenoid 22 will be energized from the A.C. terminals 19 via the closed contact points 20, as will be explained more fully hereinafter.

Gears 23 and 24 derive their motion from the synchronous motor 18. Gear 24 is attached to shaft 25 as is gear 26. Gear 26 meshes with bevel gear 27. Bevel gear 27 and cup-shaped or sun gear 28 are both attached to bushing 29 which is rotatably mounted on time shaft 30. Cup-shaped gear 28 constitutes an input element to the differential assembly 31. The other input element of the differential assembly 31 is the cup-shaped gear 32. A planet member in the form of a rectangular block 33 having a planet gear 34 journaled at one end thereof and in constant mesh with the teeth on the cup-shaped gears 28 and 32 is secured to the shaft 30 by means of a pin 35.

Input gear 32 does not normally rotate because the auxiliary spring-drive motor is not normally operative as will be more fully explained hereinafter.

The rotation of input gear 28 will cause the planet member 33 to rotate the time shaft 30. The synchronous motor 18 and the train of gearing which derives its motion from this motor is so calculated according to engineering techniques that the time shaft 30 rotates at a rate of one revolution per minute and, as a consequence, this shaft constitutes the seconds hand shaft of the master clock shown in Fig. 1. The manner in which a seconds hand shaft is geared to a minutes hand which is in turn geared to an hour hand mechanism and the provision of appropriate contacts to control a clock system are conventional and well known in the art. The description of this mechanism is intentionally ommited from this description for purposes of simplifying the description.

The spring drive mechanism for a clock (Fig. 5) comprises a shaft 25 adapted to be continuously rotated by the synchronous motor 18 (Fig. 2) and as a consequence, by virtue of the follower roller 80 which bears against the cam 81, a lever 82 is moved in a counterclockwise direction about pivot 83 when the follower roller 80 moves outwardly on the high region of cam 81. As the follower roller 80 moves inwardly approaching a low region of the cam 81, the pawl 84 is caused to rotate the ratchet wheel 85 in a clockwise direction to provide a winding motion for the main spring 86.

The stand-by motor driving train comprises a series or train of power transmitting gears which are operated from the power shaft 36 at a definite time rate controlled by an escapement means. This gear train comprises a gear 37 fixed to the power shaft 36, which receives its power from a conventional clock type spring motor Fig. 5, which may be kept in a wound state by mechanism actuated by the synchronous motor 18 or an individual winding motor in a conventional manner, as well known in the art. Gear 37 meshes with gear 38 fixed to shaft 39. Gear 38 meshes with gear 40 that is fixed to shaft 41. A gear 42 also fixed to shaft 41 meshes with bevel gear 43. Bevel gear 43 and the cup-shaped or sun gear 32 are both attached to the bushing 44 which is rotatably mounted on time shaft 30. Cup-shaped gear 32 constitutes an input element to the differential assembly 31 as previously pointed out.

The power transmitting gear train just described is operated by the power spring under control of an escape means, and through the planet member 33 in such a manner as to drive the time shaft 30 at the prescribed time rate of one revolution per minute. The time shaft 30 is adapted to be driven continuously at the prescribed rate either by the driving power dervied from the input element 28 or the input element 32 depending upon the mode of operation. That is the mode of driving will be either by electrical means or auxiliary spring-drive means. The controlling escapement means is of the conventional type and comprises an escapement drive gear 45 fixed to shaft 39 and meshing with a pinion gear 46 fixed to shaft 47. Also fixed to shaft 47 is an escapement wheel 48. Cooperating with the escape wheel is the usual verge 49 mounted for oscillation on a verge shaft 50 carrying the oscillating verge lever 51 which cooperates in the usual manner with the impulse pin 52 on the balance wheel 21. The balance wheel 21 is mounted on the balance wheel shaft 54. A more detailed description of the escapement means is considered unnecessary as it is of the conventional type and its function and operation will be readily understood by those skilled in the art.

Referring to Figs. 2 and 3, a solenoid controlled balance wheel caging mechanism indicated generally at 55 serves to keep the escapement mechanism inoperative during normal operation. During normal operation the balance wheel 21 will be caged or prevented from moving in an oscillatory manner. A lever 56 is pivoted on shaft 57 and biased in a counterclockwise direction under the pressure of spring 58. Also pivotally mounted on shaft 57 is the lever 59, which has a stud 59a attached thereto. Lever 56 has a stud 56a attached thereto. Levers 56 and 59 are interconnected by means of a "U" shaped spring 60 connected with the studs 56a and 59a. Lever 59 has a hole 59b therein surrounding the stud 61. This arrangement serves to limit the pivotal movement of lever 59 about shaft 57.

Lever 59 has a resilient bumper element 62 attached to its end and adapted to engage the peripheral edge of the balance wheel 21. During normal operation when solenoid 22 is energized, lever 59 will be in its downward or counterclockwise position and the resilient bumper element will engage the peripheral surface of balance wheel 21 thereby preventing the balance wheel from oscillating. When solenoid 22 is de-energized due to a power failure, lever 56 moves in a counterclockwise direction. As arm 56b of lever 56 approaches the limit stud 61 and stud 56a is slightly below an imaginary line passing through stud 59a in the caged position and the center of shaft 57 there is a snap-like action provided by the U shaped spring 60 that forces lever 59 in a clockwise direction on shaft 57. This snap-like movement of lever 59 serves to release and propel balance wheel 21 into an oscillatory cycle.

Another feature of the caging mechanism due to the particular constructional arrangement is that the mechanism is nonresponsive to appreciable but momentary voltage drops or fading. In other words, the usual drops that occur on commercial power lines will be ineffective to uncage the balance wheel 21. This is due to the fact that momentary drops in voltage and a residual condition in solenoid 22 does not permit the plunger 22a to move sufficiently far to actuate lever 56. Lever 56 must move through the major portion of its travel before an uncaging movement of lever 59 is effected.

Furthermore, in accordance with the present invention it is intended to alleviate the load on the spring-drive motor when the master clock is being driven by this motor during a power failure by removing the pressure of the tape sensing brushes 14 (Fig. 1). As indicated in Fig. 4, solenoid 63 is connected in parallel with solenoid 22 and synchronous motor 18. When there is a power failure, solenoid 63 will be de-energized. As shown in Fig. 1, the plunger 63a of solenoid 63 is mechanically linked to the tape sensing brush supporting bracket 64, which is pivotally mounted on shaft 65. With the de-energization of solenoid 63, a spring 66 causes bracket 64 to be pivoted clockwise about shaft 65 thereby removing the tape sensing brushes 14 from their tape sensing position. Such a transfer presents no obstacle to the proper operation of the master program control system inasmuch as when the current supply is unavailable for driving the synchronous motor 18 it is also unavailable to drive and control the remotely located secondary clocks and signals. The transfer serves to reduce the torque requirements for the spring-drive motor.

In accordance with the present invention, during a power failure the time indicating elements of the master clock and the program tape will be advanced at the prescribed rate by the spring-drive motor. A further feature of the invention is the elimination of fractional minute discrepancies from the time of a standard time source caused by fractional minute power failures. Referring to Fig. 2, it may be seen that cam 67, attached to shaft 39 which during normal operation does not rotate, holds contacts 20 in a closed state. During a power failure when the balance wheel 21 is uncaged shaft 39 will rotate at the rate of one revolution per minute. Cam 67 is adapted to close the contacts 20 for about a two-second interval during each cycle of rotation. When there is a power failure of two seconds or more balance wheel 21 will be uncaged causing shaft 39 to be turned so that contacts 20 will open. After contacts 20 open should the electric power be restored at any instant during the succeeding 58 seconds the clock movement will not be restored to its normal electric drive operation until contacts 20 are closed at the end of the one-minute interval. If the power had not been restored when contacts 20 close at the end of the one minute interval, the spring-drive motor will continue to drive the clock and program in one minute increments until such time as the electric power is restored and contacts 20 close for the first time after the restoration of power. When electric power is restored and on the first subsequent closing of contacts 20, the spring-drive motor will be caged and synchronous motor 18 will take up the driving operation for the clock mechanism. Thus, it should be apparent that during a power failure the spring-drive motor will drive the clock mechanism on one or more full minute increments depending upon the duration of the power failure. This action serves to eliminate variations from true time which may otherwise result from an accumulation of fractional minute power failures. This is of particular advantage when a signal control program device is used in a master clock controlled system.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a sustained power clock, the combination of a source of alternating current supply; a synchronous motor adapted to rotate in timed relationship with said source; a differential assembly including a pair of input elements and an output element; means operatively connecting said synchronous motor to one of said input elements in driving relationship; an auxiliary spring drive means including a balance wheel arranged to oscillate at a timed rate and a drive shaft driven in unison with said balance wheel and operatively connected to the other input element of the differential assembly in driving relationship; time indicating means including a time shaft connected with said output element and adapted to be rotatively driven at a timed rate; a pair of pivotally mounted members interconnected by resilient means, a first of said members having a portion adapted to frictionally engage the periphery of said balance wheel during normal operation; an electromagnet having a plunger movable between an energized and de-energized position and connected with the second of said members; a biasing spring operative upon the de-energization of said electromagnet to move said plunger to its de-energized position upon failure of current flow from said source thereby providing said first member with a snap-like movement to propel said balance wheel into oscillatory movement.

2. In a sustained power clock, the combination of a source of current supply, an electric drive means, a differential assembly including a pair of input elements and an output element, means operatively connecting said electric drive means to one of said input elements in driving relationship, an auxiliary drive means including a drive shaft operatively connected to the other input element of the differential assembly in driving relationship, a time shaft connected with said output element and adapted to be rotatively and continuously driven at a predetermined rate, electrically operated means for normally holding said auxiliary drive motor inoperative and released upon failure of current flow from said source to permit said auxiliary drive means to operate, and a circuit for connecting said electric drive means and said holding means with said source including contacts that are normally held in a closed position by a cam means connected to said auxiliary drive means and driven during a power failure to periodically close the circuit so as to test for the resumption of current flow that will energize said holding means and said electric drive means thereby restoring the system to its normal operation.

3. In a sustained power clock, the combination of a source of alternating current supply, a synchronous motor, a differential assembly including a pair of input elements and an output element, means operatively connecting said synchronous motor to one of said input elements, an auxiliary spring driven means including a balance wheel and operatively connected to the other input element of the differential assembly, an electrically controlled snap-acting means adapted to frictionally engage the periphery of said balance wheel and prevent the movement thereof during normal operation and to propel said balance wheel into operation upon failure of current flow from said source, and a circuit coupling said synchronous motor and said electrically controlled snap-acting means to said source including contacts normally held in a closed position by a normally inoperative cam that is adapted to be driven by the spring driven means during a power failure to periodically close the circuit so as to test for the resumption of current flow which will actuate said snap-acting means to stop said spring driven means and to restore power to said synchronous motor thereby restoring the clock to its normal operation.

4. In a sustained power clock, the combination of a source of alternating current supply, a synchronous motor, a differential assembly including a pair of input elements and an output element, means operatively connecting said synchronous motor to one of said input elements, an auxiliary spring drive means including a balance wheel and operatively connected to the other input element of the differential assembly, an electromagnetically controlled snap-acting mechanical means including a force transmitting member adapted to frictionally engage the periphery of said balance wheel and prevent the movement thereof during normal operation and to apply a propelling movement to said balance wheel upon cessation of current flow from said source, and a circuit coupling said synchronous motor and said electromagnetically controlled snap-acting mechanical means to said source including contacts normally held in a closed position by a normally inoperative cam that is adapted to be driven by the spring-drive means during a power failure to periodically close the circuit so as to test for the resumption of current flow which will actuate said snap-acting means to stop said spring-drive means and to restore power to said synchronous motor thereby restoring the clock to its normal operation.

5. In a sustained power clock, the combination of a source of alternating current supply, a synchronous motor, a differential assembly including a pair of input elements and an output element, means operatively connecting said synchronous motor to one of said input elements, an auxiliary spring drive means including a balance wheel and operatively connected to the other input element of the differential assembly and time indicating means connected with said output element, a pair of pivotally mounted members interconnected by resilient means, a first of said members having a portion adapted to frictionally engage the periphery of said balance wheel during normal operation and prevent the movement thereof, an electromagnet having a plunger movable between an energized and de-energized position and connected with the second of said members, a biasing spring operative upon the de-energization of said electromagnet to move said plunger to its de-energized position thereby providing said first member with a snap-like movement to propel said balance wheel into oscillatory movement upon the failure of current flow from said source, and a circuit coupling said synchronous motor and said electromagnet to said source including contacts normally held in a closed position by a normally inoperative cam that is adapted to be driven by the spring-drive means during a power failure to periodically close the circuit so as to test for the resumption of current flow which will actuate said snap-acting means to stop said spring-drive means and to restore power to said synchronous motor thereby restoring the clock to its normal operation.

6. In a sustained power clock, the combination of a source of alternating current supply, a synchronous motor; a planet gear differential including two sun gears; gear means to operatively connect said synchronous motor to one of said sun gears; an auxiliary spring driven clock escapement means including a balance wheel gearedly connected to the other sun gear; an electromagnetically controlled snap-acting mechanism including a force transmitting member adapted to frictionally engage the periphery of said balance wheel and prevent the movement thereof during normal operation and for applying a propelling movement to said balance wheel upon cessation of current flow from said source; and a circuit coupling said synchronous motor and said electromagnetically controlled snap-acting means to said source including contacts normally held in a closed position by a normally inoperative cam that is adapted to be driven by the spring driven clock escapement means during a power failure to periodically close the circuit so as to test for the resumption of current flow which will actuate said snap-acting means to stop said balance wheel and to restore power to said synchronous motor thereby restoring the clock to its normal operation.

References Cited in the file of this patent

UNITED STATES PATENTS

| | | |
|---|---|---|
| 1,930,256 | Sprecker | Oct. 10, 1933 |
| 1,943,079 | Kienzle | Jan. 9, 1934 |
| 2,483,502 | Nelson | Oct. 4, 1949 |

FOREIGN PATENTS

| | | |
|---|---|---|
| 432,932 | Great Britain | Aug. 6, 1935 |
| 437,593 | Great Britain | Oct. 24, 1935 |